Nov. 4, 1947.   M. P. DOUGHERTY   2,430,045
MULTIPORTED SPRAY DEVICE
Filed July 8, 1944
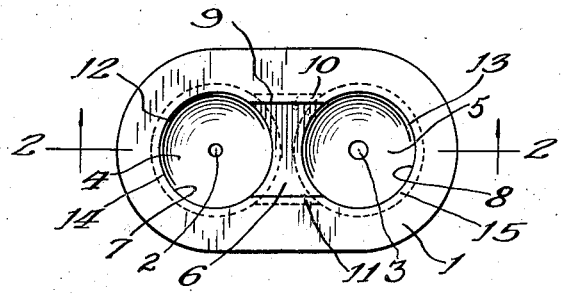
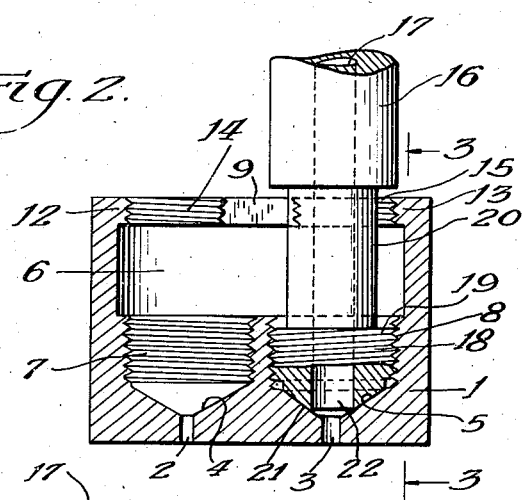
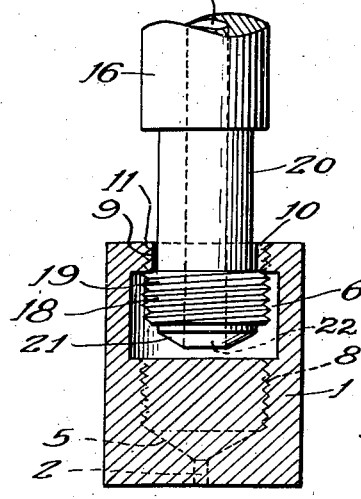
Inventor:
Martinello Patrick Dougherty
By: Stone, Artman & Bisson,
Attorneys:

Patented Nov. 4, 1947

2,430,045

UNITED STATES PATENT OFFICE 2,430,045

MULTIPORTED SPRAY DEVICE

Martinello Patrick Dougherty, Marysville, Kans.

Application July 8, 1944, Serial No. 544,016

8 Claims. (Cl. 299—132)

The present invention relates to a spray device having a head or body provided with a plurality of spray orifices of different sizes and a fluid conducting means relatively adjustable to provide selective connection in hermetically sealed condition with any of the orifices.

In devices of this kind the means carrying the orifices, such as a head, usually is slidably connected to the fluid conducting element whereby there is always a leakage between them and this leakage increases with the wear of the relatively slidable parts.

Among the objects of the present invention is to provide a novel device wherein the fluid conducting or supply means or duct is so connected to the selected part of the orifice means as to be fluid tight and positively sealed, as hermetically sealed, against any chance for leakage. In a particular structure each orifice part and the fluid supply element have co-acting counterpart seats and also complementary securing means, such as screw threads, so that the selected orifice part and the fluid duct means may be physically sealed together, as by the screwing of the parts together and the positive seating of the counterpart seats.

Another object of the invention is to provide a novel means for holding the parts, such as the head having the orifice means and the fluid duct means, together and from becoming separated when the duct element is disconnected from the orifice part, yet which can be separated by the user when it is desired to do so.

Other objects, capabilities, advantages, features and the like are comprehended by the invention as will later appear, and as are inherently possessed by the invention.

Referring to the drawings:

Fig. 1 is a front end view of the device;

Fig. 2 is a sectional view through the same taken in a plane represented by line 2—2 in Fig. 1 of the drawings.

Fig. 3 is a transverse sectional view taken in a plane represented by line 3—3 in Fig. 2.

Referring more in detail to the embodiment chosen to illustrate the invention, the device comprises a body or head 1 provided at an end thereof, as at the forward end thereof, with a plurality of discharge orifices 2 and 3, inwardly of which are provided a corresponding number of valve seats 4 and 5. Within the body 1 is provided a chamber 6 which in the form shown is elongated and is provided at the ends thereof with threaded sockets 7 and 8 in alignment with the orifices 2 and 3. At the other end of the body 1, that is opposite from the orifices 2 and 3, is provided an elongated opening 9 with inwardly extending side flanges 10 and 11 and end flanges 12 and 13, which flanges overhang the sides and the ends of the chamber 6, so that the opening 9 is narrower and shorter than the width and length of the chamber 6. At the ends of the opening 9 the flanges are provided with threaded portions 14 and 15 of the same diameter and of the same pitch as the threaded portions 7 and 8.

With the body 1 is detachably connected a fluid duct 16 having a passage 17 leading to a head 18, the latter being provided with threads 19 to threadedly fit the threads 7 and 8, and also the threads 14 and 15. Between the body portion of the duct 16 and the head portion 18 the duct has a reduced diameter portion or neck 20 which is of a diameter less than the width of the elongated opening 9 so that when the head 18 is disconnected from the threaded portion 7 or 8, the head 18 may be shifted along the chamber 6 and the neck portion 20 may be shifted along the opening 9 and the side flanges 10 and 11 from one to the other of the threaded portions 7 and 8 to be connected selectively to another of the threaded portions 8 or 7, as the case may be. The end of the head 18 preferably has a tapered seat 21 adapted to seat upon and to seal with the seat 4 or 5, as the case may be, and also has an opening 22 to register with the orifice 2 or 3.

In assembling the device, the threaded head 18 is first threaded through with thread port 14 or 15 so that the head 18 is entered within the chamber 6 and beyond the flanges 10, 11, 12 and 13. The duct may then be shifted with the neck 20 along the opening 9 and along the flanges 10 and 11 to bring the head 18 opposite either socket 7 or 8 depending upon which orifice 2 or 3 may be chosen through which the fluid is to be projected. See Fig. 3. Because of the flanges 10, 11, 12 and 13 extending inwardly the duct means is not free to separate from the body 1 of its own accord, and can only be freed by unscrewing the head 18 through the threaded parts 14 or 15.

As the duct is moved to selected position to be connected to either the socket 7 or 8, the head 18 is then screwed into the selected socket 7 or 8, and the seat 21 is tightly seated upon and sealed with the seat 4 or 5, as the case may be. The orifice 22 is then in register or alignment with the orifice 2 or 3, as the case may be. In this way there is a tight sealing between the duct 17 and the selected orifice portion 2—4 or 3—5, and the sealing is not affected by any wear of the seat 21, and the seats 4 and 5, for each time the head is screwed in place there is always a tight seating and sealing of said seats.

To change from one selected position to another, the head 18 is unscrewed from the socket 8 or 7 to bring the head 18 into the chamber 6 and then the duct means may then be shifted, as previously explained. When the head 18 is thus unscrewed and is in the chamber 6, the duct means cannot become free from the body 1 because of the flanges 10, 11, 12 and 13 preventing the free passage of the head 18. Therefore, the duct means is normally maintained connected to the body 1 even though such connection may be a loose connection.

Having herein described and upon the drawings shown an illustrative embodiment of the invention it is to be understood that the invention is not limited thereto but comprehends other constructions, details, arrangements of parts, features and the like without departing from the spirit of the invention.

Having thus disclosed the invention, I claim:

1. A spray device of the character disclosed, comprising a body provided with a plurality of orifices of different sizes and with seats respectively encircling said orifices, a fluid duct means provided with a discharge port that opens endwise outwardly of such duct means for selectively registering with said orifices and having a seat encircling said port for selectively sealing with the seats about said orifices, means for retaining the duct means and body loosely coupled together in a manner adapting translatory movement of the duct means and port into selective registry with the orifices, and connecting means on said body and said duct means for selectively connecting said duct means in registry with said orifices and in sealing engagement with said seats, said connecting means comprising counterpart threaded portions provided on said body adjacent and coaxially of said seats adjacent said orifices and on said duct means in coaxial relation therewith for said selectively connecting of said duct means when said body and the duct means are relatively rotated coaxially of said duct means and of the selected orifice.

2. A spray device of the character disclosed, comprising a body provided with an elongated chamber and a plurality of orifices in communication with said chamber at a side of said chamber, said body having seats respectively circumscribing said orifices and an elongated opening opposite said seats and at another side of said chamber, a fluid duct means provided with a port which opens endwise therefrom for selectively registering with said orifices and having a head for translatory displacement in said chamber while the duct means has similar displacement within and lengthwise of said elongated opening, said head being provided with a seat circumscribing said port for selectively sealing with said seats adjacent said orifices, and connecting means on said body and said head for selectively connecting said duct means in registry with said orifices and in sealing engagement with said seats.

3. A spray device of the character disclosed, comprising a body having a frontal end wall provided with a plurality of orifices of different sizes, a rear end wall provided with an elongated slot, and an elongated chamber in said body and communicating with said orifices and said slot, a fluid duct means comprising a head portion, a shank portion and a neck portion between said head portion and said shank portion, said head portion being of a diameter greater than the width of said slot and less than the width of said chamber, said frontal wall and said head portion having means for selectively connecting said head portion in alinement with said orifices.

4. A spray device of the character disclosed, comprising a body having a frontal end wall provided with a plurality of orifices of different sizes, a rear end wall provided with an elongated slot, and an elongated chamber in said body and communicating with said orifices and said slot, a fluid duct means comprising a head portion, a shank portion and a neck portion between said head portion and said shank portion, said head portion being of a diameter greater than the width of said slot and less than the width of said chamber, said frontal wall and said head portion having means for selectively connecting said head portion in alinement with said orifices, said frontal end wall having seats adjacent said orifices, and said head portion having a seat for selectively seating on and sealing with said seats of said orifices.

5. A spray device of the character disclosed, comprising a body having a frontal end wall provided with a plurality of orifices of different sizes, a rear end wall provided with an elongated slot, and an elongated chamber in said body and communicating with said orifices and said slot, a fluid duct means comprising a head portion, a shank portion and a neck portion between said head portion and said shank portion, said head portion being of a diameter greater than the width of said slot and less than the width of said chamber, said frontal wall and said head portion having means for selectively connecting said head portion in alinement with said orifices, said connecting means comprising threaded sockets provided on said frontal end wall adjacent said orifices, and said head portion having threads for selectively engaging said sockets.

6. A spray device of the character disclosed, comprising a body having a frontal end wall provided with a plurality of orifices of different sizes, a rear end wall provided with an elongated slot, and an elongated chamber in said body and communicating with said orifices and said slot, a fluid duct means comprising a head portion, a shank portion and a neck portion between said head portion and said shank portion, said head portion being of a diameter greater than the width of said slot and less than the width of said chamber, said frontal wall and said head portion having means for selectively connecting said head portion in alinement with said orifices, said frontal end wall having seats adjacent said orifices, and said head portion having a seat for selectively seating on and sealing with said seats of said orifices, said connecting means comprising threaded sockets provided on said frontal end wall adjacent said orifices, and said head portion having threads for selectively engaging said sockets.

7. A spray device of the character disclosed, comprising a body having a frontal end wall provided with a plurality of orifices of different sizes, a rear end wall provided with an elongated slot, and an elongated chamber in said body and communicating with said orifices and said slot, a fluid duct means comprising a head portion, a shank portion and a neck portion between said head portion and said shank portion, said head portion being of a diameter greater than the width of said slot and less than the width of said chamber, said frontal wall and said head portion having means for selectively connecting said head portion in alinement with said orifices, said connecting means comprising threaded sockets provided on said frontal end wall adjacent said orifices, and said head portion having threads for selectively engaging said sockets, said rear end wall having a portion at said slot threaded for the threading therethrough of said head portion.

8. A multi-orifice spraying device for non-accidental-detachment assembly with a duct having an end portion in the form of a threaded head which is greater in diameter than the portion of the duct adjacent to said head; said device having a chamber, a frontal end wall at a side of said chamber and provided with a plurality of orifices of different spraying character, spaced-apart threaded recesses in the inner side of said frontal wall in respective communication with said orifices, a rear end wall at the opposite side of said chamber and provided with a slot communicating with the chamber and extending lengthwise of the spacing of said recesses, said slot also having an opening threaded to mesh with the threads on the duct head, the spacing between said frontal wall and said rear wall exceeding the length of said head and the width of said slot exceeding the diameter of said portion of the duct adjacent to the head wherefore the head can be advanced through the threaded opening in the slot into said chamber and thereafter shifted laterally within the chamber into selected registry with said threaded recess; the threads in each recess also being meshable with the threads on the duct head so the selected of said recesses can be coupled therewith, and said slot being narrower than the duct head to prevent accidental detachment of the device from the duct while said head is in the chamber but uncoupled from any recess.

MARTINELLO PATRICK DOUGHERTY.

REFERENCES CITED

The following references are of record in the file of this patent:

UNITED STATES PATENTS

| Number | Name | Date |
|---|---|---|
| 1,504,981 | Selfridge | Aug. 12, 1924 |
| 1,554,521 | Reece | Sept. 22, 1925 |
| 1,798,709 | Smith | Mar. 31, 1931 |
| 1,964,807 | Baum | July 3, 1934 |
| 1,968,391 | Hamilton | July 31, 1934 |